Patented July 21, 1925.

1,546,616

UNITED STATES PATENT OFFICE.

CARL BUBERL, OF DETROIT, MICHIGAN.

COMPOSITION FOR REFRACTORY WICKS.

No Drawing.  Application filed December 28, 1923. Serial No. 683,134.

*To all whom it may concern:*

Be it known that I, CARL BUBERL, a citizen of the country of Austria, and resident of the city of Detroit, county of Wayne, and State of Michigan, have invented certain new and useful Improvements in Compositions for Refractory Wicks, of which the following is a specification.

It is the primary object of my invention to provide a composition which may be molded into suitable form for use as a wick in oil burning machines.

I have found that carborundum or carbide of silicon is an excellent material for use in the construction of wicks because it is a good conductor of heat and provides excellent capillary attraction.

In effecting my composition I have found that very good results may be obtained by using about 96.51 per cent carbon of silicon and either 3.49 per cent feldspar or 2.54 per cent enamel and .95 per cent borax, all by weight. To this I add 7.14 per cent of the whole, by weight, of a mixture composed of 53.45 per cent flour, 35.55 per cent water and 11 per cent linseed oil. This latter mixture will act as a binder for the first mixture during the lower temperature while the composition is being baked or burned.

After the composition has been thoroughly mixed, it is formed into a desired shape and then placed in an oven where it is slowly brought to a temperature of about 1400 degrees Fahrenheit and kept at such heat for a period of three to four hours. The mixture of flour, water and linseed oil will burn at a temperature of about 1200 degrees leaving the mass of a somewhat porous nature so as to assist in making it suitable for use as a wick.

Thus, the flour, water and linseed oil acts as a binder in the initial formation, but burns out to afford porosity after being heated to a high temperature, when the feldspar or the enamel and borax (whichever is used) acts as the binder for the finished product.

While I have obtained the best results from the above composition, I desire it to be understood that the primary object of my invention is the use of carbide of silicon in a composition of this nature. The amount of carbide of silicon used may of course be varied somewhat to suit conditions and other binding materials than feldspar or enamel and borax or flour, water and linseed oil as well as other proportions thereof may be used.

It is my intention to cover by my claims such changes as may be reasonably included within the scope of my invention.

What I claim is:

1. A refractory wick composition of the class described including carbide of silicon and a binder.

2. A refractory wick composition of the class described including carbide of silicon approximately in the amount of 96.51 per cent of the whole and a binder.

3. A refractory wick composition of the class described including carbide of silicon and borax.

4. A refractory wick composition of the class described including carbide of silicon, enamel and borax in the porportions of approximately 96.51 per cent, 2.54 per cent and .95 per cent, respectively.

5. A refractory wick composition of the class described including carbide of silicon, a binder requiring a relatively high burning heat and a binder which will burn at a lower heat than said first binder.

6. A refractory wick composition of the class described including carbide of silicon, flour, water and linseed oil.

7. A refractory wick composition of the class described including carbide of silicon and a binder, to which another binder of flour, water and linseed oil has been added.

8. A refractory wick composition of the class described including carbide of silicon and a binder, to which another binder of flour, water and linseed oil in an amount equal to approximately 7.14 per cent of the carbide of silicon and first binder has been added.

9. A refractory wick composition of the class described including carbide of silicon and a binder to which has been added approximately 7.14 per cent of the whole of flour 53.45 per cent, water 35.55 per cent and linseed oil 11 per cent.

10. A refractory wick composition of the class described including carbide of silicon, enamel, borax and a binder.

11. A refractory wick composition of the class described including carbide of silicon, enamel, borax, flour, water and linseed oil.

12. A refractory wick composition of the class described including carbide of silicon approximately 96.51 per cent, enamel approximately 2.54 per cent, borax approximately .95 per cent and a binder.

13. A refractory wick composition of the class described including carbide of silicon approximately 96.51 per cent, enamel approximately 2.54 per cent, borax approximately .95 per cent and a binder consisting of flour, water and linseed oil in a combined amount approximately equal to 7.14 per cent of the combined carbide of silicon, enamel and borax.

14. A refractory wick composition of the class described including carbide of silicon and enamel.

CARL BUBERL.